US009645298B2

(12) United States Patent
Fu

(10) Patent No.: US 9,645,298 B2
(45) Date of Patent: May 9, 2017

(54) BACKLIGHT MODULE AND LIQUID CRYSTAL DISPLAY DEVICE

(71) Applicants: BOE TECHNOLOGY GROUP CO., LTD., Beijing (CN); Beijing BOE Vision-Electronic Technology Co., Ltd., Beijing (CN)

(72) Inventor: Changjia Fu, Beijing (CN)

(73) Assignees: BOE TECHNOLOGY GROUP CO., LTD., Beijing (CN); BEIJING BOE VISION-ELECTRONIC TECHNOLOGY CO., LTD., Beijing (CN)

( * ) Notice: Subject to any disclaimer, the term of this patent is extended or adjusted under 35 U.S.C. 154(b) by 512 days.

(21) Appl. No.: 14/317,593

(22) Filed: Jun. 27, 2014

(65) Prior Publication Data
US 2015/0277021 A1 Oct. 1, 2015

(30) Foreign Application Priority Data
Mar. 31, 2014 (CN) .......................... 2014 1 0127541

(51) Int. Cl.
*F21V 7/04* (2006.01)
*F21V 8/00* (2006.01)
*G02F 1/1335* (2006.01)

(52) U.S. Cl.
CPC .......... *G02B 6/0023* (2013.01); *G02B 6/002* (2013.01); *G02B 6/0055* (2013.01); *G02B 6/0061* (2013.01); *G02B 6/0073* (2013.01); *G02B 6/0031* (2013.01); *G02B 6/0036* (2013.01); *G02F 1/133615* (2013.01)

(58) Field of Classification Search
CPC .... G02B 6/0023; G02B 6/002; G02B 6/0031; G02B 6/0036; G02B 6/0055; G02B 6/0061; G02B 6/0073
USPC ................................................ 362/623–626
See application file for complete search history.

(56) References Cited

U.S. PATENT DOCUMENTS

| 7,543,970 B2 * | 6/2009 | Kiyohara ............. G02B 6/0031 362/561 |
| 7,771,100 B2 * | 8/2010 | Yamamoto ........... G02B 6/0033 362/606 |
| 7,806,539 B2 * | 10/2010 | Parker ....................... F21V 5/00 362/19 |
| 2004/0114344 A1 * | 6/2004 | Burtsev ................ G02B 6/0001 362/604 |

(Continued)

*Primary Examiner* — Bryon T Gyllstrom
(74) *Attorney, Agent, or Firm* — Nath Goldberg Meyer; Joshua B. Goldberg

(57) ABSTRACT

Embodiments of the present invention provide a backlight module and a liquid crystal display device. The backlight module comprises a light bar, a light guide plate and a reflector sheet. The light guide plate and the reflector sheet are adhered to each other. An anti-reflection structure is provided on at least one side of the light guide plate and/or the reflector sheet. The anti-reflection structure is used for reducing light reflected by the reflector sheet which is emitted from the light sources. The anti-reflection structure includes anti-reflection structures. A first anti-reflection structure is located on one side of the light guide plate and/or the reflector sheet close to the light bar, while a second anti-reflection structure is located on other sides of the light guide plate and/or the reflector sheet. The present invention may improve the luminescence uniformity of the backlight module.

10 Claims, 6 Drawing Sheets

(56) References Cited

U.S. PATENT DOCUMENTS

| | | | | |
|---|---|---|---|---|
| 2004/0252483 | A1* | 12/2004 | Cheng | G02B 6/002 |
| | | | | 362/613 |
| 2006/0056200 | A1* | 3/2006 | Yamashita | G02B 6/0013 |
| | | | | 362/620 |
| 2007/0139956 | A1* | 6/2007 | Sugimoto | G02B 6/0055 |
| | | | | 362/600 |
| 2009/0168459 | A1* | 7/2009 | Holman | G02B 6/0038 |
| | | | | 362/623 |
| 2010/0220497 | A1* | 9/2010 | Ngai | G02B 6/002 |
| | | | | 362/610 |
| 2013/0010496 | A1* | 1/2013 | Higashi | G02B 6/0031 |
| | | | | 362/609 |

* cited by examiner

BACKLIGHT MODULE AND LIQUID CRYSTAL DISPLAY DEVICE

FIELD OF THE INVENTION

The present invention relates to the field of display technology, and in particular relates to a backlight module and a liquid crystal display device.

BACKGROUND OF THE INVENTION

A TFT-LCD (Thin Film Transistor Liquid Crystal Display) has been widely applied to various display fields due to its advantages of low power consumption, low cost, etc.

Liquid crystal itself does not emit light, so a backlight module for providing display backlight is generally disposed inside the TFT-LCD, and the quality of the backlight module will directly influence the display quality of a liquid crystal display device.

At present, the structure of a common backlight module is as shown in FIG. 1. The backlight module mainly includes a light source 1, a bottom reflector sheet 2 and a light guide plate 3. The light source 1 transmits light from one side of the light guide plate 3. The light is reflected by the bottom reflector sheet 2 and then totally reflected inside the light guide plate 3, so that the light input from one side is effectively turned into a planar light source with good uniformity. In the prior art, to improve the brightness of the light source 1, an LED light bar (Light-Emitting Diode) may be usually used as the light source 1. To reduce the cost of the product, the specific structure of the LED light bar may be as shown in FIG. 2 usually, wherein the LED light bar serving as the light source 1 includes a plurality of LED 11 arranged at intervals. Due to the restriction of the irritation angle of the LED 11 and the distance from the LED 11 to the light guide plate 3, a blind area (area A in the figure) which cannot be directly irradiated by light will be generated between two LED 11. The brightness of this area is relatively dark. However, a luminous area (area B in the figure) on the front side of the LED 11 is relatively bright. Such a structure is likely to cause the backlight source to present appearance of bright/dark-bright/dark area intervals, i.e., causing a hotspot phenomenon. On the other hand, to reduce the loss of light, a lateral reflection film is also adhered to the edge of the light guide plate 3 on two sides of the LED light bar so as to allow light to return back to the light guide plate 3 again, so that light on the edges of the light guide plate is strong, light reflection at the edge area (area C in FIG. 2) is reinforced, and luminescence of the backlight module is not uniform. With the development of narrow frame of the display device, the distance from a light source 1 to the light guide plate is further diminished, so that the hotspot phenomenon or edge light reflection becomes more obvious, the non-uniform luminescence of the bright/dark-bright/dark area intervals is very likely to be observed by naked eyes of a user, and the display effect of the liquid crystal device is thus influenced seriously.

SUMMARY OF THE INVENTION

The embodiments of the present invention provide a backlight module and a liquid crystal display device, which may improve the luminescence uniformity of the backlight module.

To achieve the above object, the embodiments of the present invention employ the following technical solutions.

In one aspect, the embodiments of the present invention provide a backlight module, including a light bar, a light guide plate and a reflector sheet, the light guide plate and the reflector sheet being adhered to each other, the light bar being located on one side of the light guide plate and including light sources which are arranged at intervals;

an anti-reflection structure is provided on at least one side of the light guide plate and/or the reflector sheet and used for reducing light reflected by the reflector sheet which is emitted from the light sources;

the anti-reflection structure includes a first anti-reflection structure and/or a second anti-reflection structure, the first anti-reflection structure being located on a first side of the light guide plate and/or the reflector sheet close to the light bar, while the second anti-reflection structure being located on at least one side other than the first side of the light guide plate and/or the reflector sheet, wherein the first anti-reflection structure is corresponding in terms of shape to the primary reflective region of the reflector sheet onto which the light sources irradiate.

The first anti-reflection structure includes a plurality of first hollow regions located on one side of the reflector sheet close to the light bar, and the first hollow regions are in one-to-one correspondence with the positions of the light sources.

Further, the first hollow regions are circular, elliptic or rectangular in shape; and the area of the primary reflective region of the reflector sheet onto which the light sources irradiate is less than or equal to the area of the first hollow regions.

The second anti-reflection structure includes a plurality of second hollow regions located on edges of the reflector sheet corresponding to two sides of the light bar and/or located on an edge at one side of the reflector sheet away from the light bar.

A plurality of transmission-prevention regions are provided on the dot-pattern layer.

Further, a plurality of first transmission-prevention regions are provided on one side of the dot-pattern layer close to the light bar, and the first transmission-prevention regions are in one-to-one correspondence with the positions of the light sources; and in the dot-pattern layer, the dot-pattern density of the first transmission-prevention regions is less than that of the dot-pattern layer other than the transmission-prevention regions.

A plurality of second transmission-prevention regions are provided on edges of the dot-pattern layer corresponding to two sides of the light bar and/or an edge at one side of the dot-pattern layer away from the light bar; and in the dot-pattern layer, the dot-pattern density of the second transmission-prevention regions is less than that of the dot-pattern layer other than the transmission-prevention regions.

Further, in the second transmission-prevention regions, the dot-pattern density on one side close to the light bar is less than that on the side away from the light bar.

It is to be noted that, the light sources may include LED.

In another aspect, the embodiments of the present invention further provide a liquid crystal display device, including the backlight module described above.

In the backlight module and the liquid crystal display device provided by the embodiments of the present invention, the backlight module includes a light bar, a light guide plate and a reflector sheet, the light guide plate and the reflector sheet are adhered to each other, and the light bar is located on one side of the light guide plate and includes a plurality of light sources arranged at intervals. Further, an anti-reflection structure used for reducing light reflected by the reflector sheet which is emitted from the light sources is disposed on at least one side of the light guide plate or the reflector sheet. Thus, light outgoing from the front sides of the light sources is prevented from being reflected by the reflector sheet, and there is not an obvious brightness difference between light from a front side area of the light sources, light between two light sources and light from the edge area of the backlight module, so that the occurrence of a hotspot phenomenon or edge light reflection is avoided effectively, the luminescence uniformity of the backlight module is improved, and the display effect of a liquid crystal display device is improved significantly.

BRIEF DESCRIPTION OF THE DRAWINGS

To describe the technical solutions in the embodiments of the present invention or in the prior art more clearly, the accompanying drawings required to be used in description of the embodiments or the prior art will be briefly introduced below. Apparently, the accompanying drawings in the following description show merely some embodiments of the present invention, and a person of ordinary skill in the art may still derive other drawings from these accompanying drawings without creative efforts.

DETAILED DESCRIPTION OF THE EMBODIMENTS

The technical solutions in the embodiments of the present invention will be clearly and completely described below with reference to the accompanying drawings in the embodiments of the present invention. Apparently, the described embodiments are merely a part of but not all of embodiments of the present invention. Based on the embodiments in the present invention, all other drawings made by a person of ordinary skill in the art without creative efforts shall fall into the protection scope of the present invention.

Figure 1:
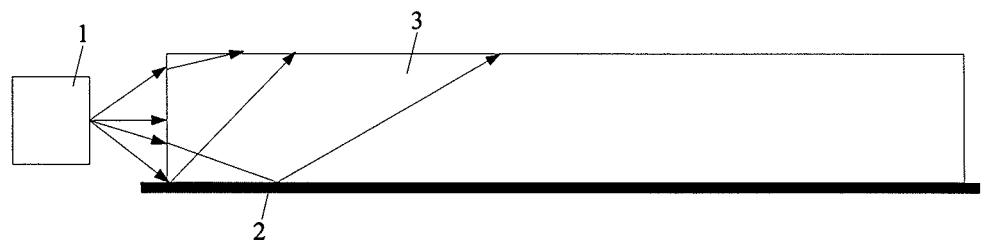
FIG. 1 is a schematic view of a structure of a backlight module in the prior art.
Figure 2:
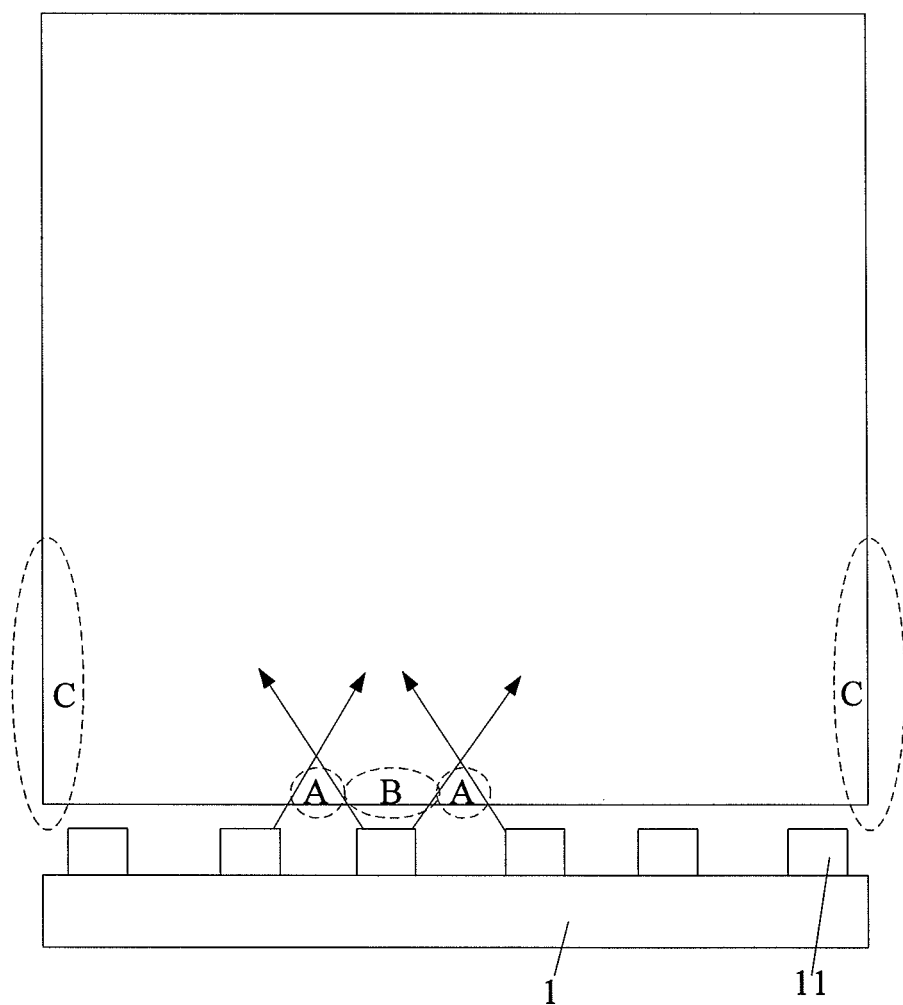
FIG. 2 is a top view of the structure of the backlight module in the prior art.
Figure 3:
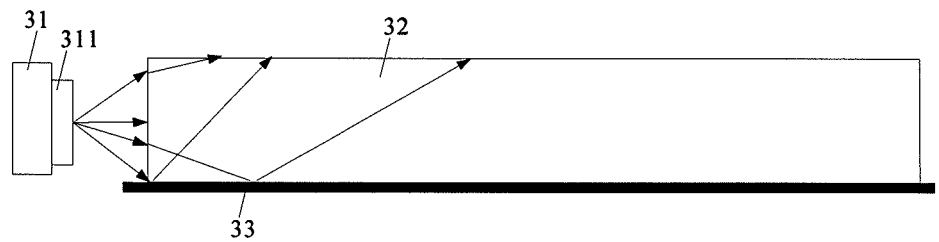
FIG. 3 is a schematic view of a structure of a backlight module according to an embodiment of the present invention.

The embodiments of the present invention provide a backlight module. As shown in FIG. 3, the backlight module includes a light bar 31, a light guide plate 32 and a reflector sheet 33. The light guide plate 32 and the reflector sheet 33 are adhered to each other. The light bar 31 is located on one side of the light guide plate 32. As further shown in FIG. 4, the light bar 31 includes a plurality of light sources 311 which are arranged at intervals.

An anti-reflection structure 34 is provided on at least one side of the light guide plate 32 and/or the reflector sheet 33 and used for reducing light reflected by the reflector sheet 33 which is emitted from the light sources 311.

The anti-reflection structure 34 includes a first anti-reflection structure 341 and/or a second anti-reflection structure 342, wherein the first anti-reflection structure 341 is located on a first side l of the light guide plate 32 and/or the reflector sheet 33 close to the light bar 31, while the second anti-reflection structure 342 is located on at least one side other than the first side l of the light guide plate 32 and/or the reflector sheet 33.

Figure 4:
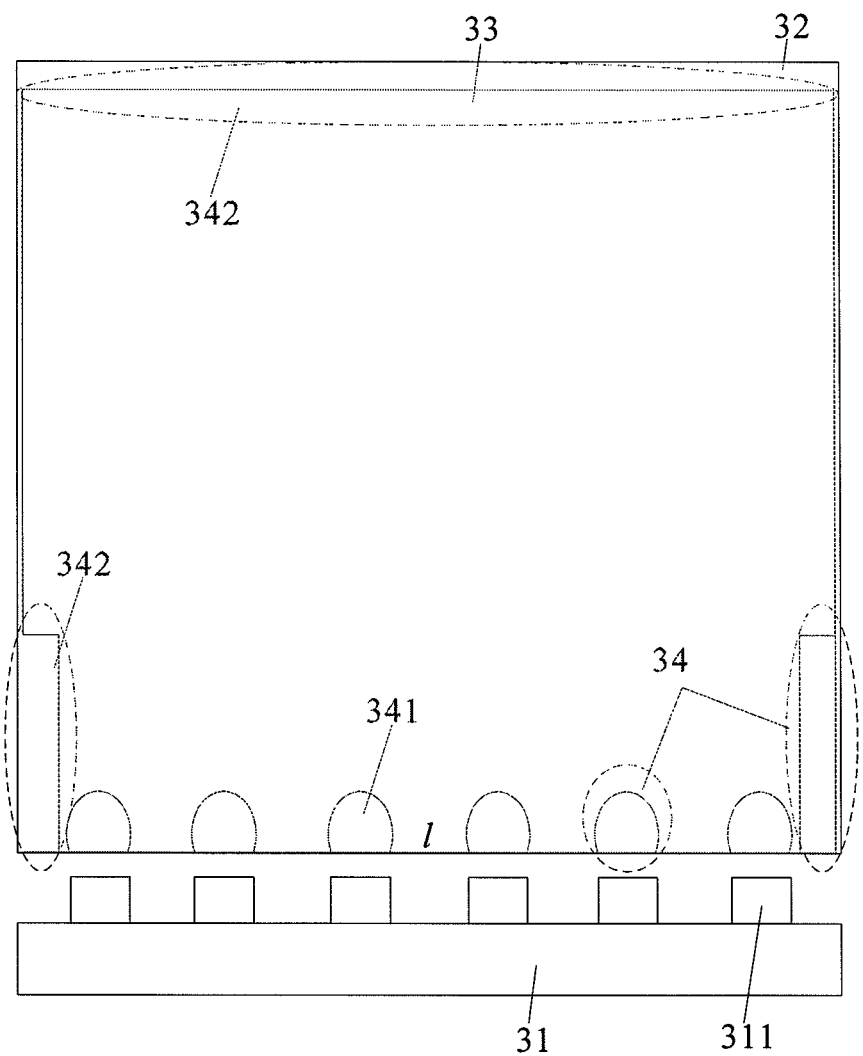
FIG. 4 is a top view of the structure of the backlight module according to the embodiment of the present invention.

In the backlight module as shown in FIG. 4, the description is illustrated by taking the anti-reflection structure 34 including the first anti-reflection structure 341 located on one side of the light guide plate 32 or the reflector sheet 33 close to the light bar 31 and the second anti-reflection structure 342 located on left and right sides of the light guide plate 32 or the reflector sheet 33 as example.

Specifically, when the first anti-reflection structure 341 located at one side of the light guide plate 32 and/or the reflector sheet 33 close to the light bar 31 exists, the region of the first anti-reflection structure 341 is corresponding in terms of shape to the primary reflective region of the reflector sheet 33 onto which the light sources 311 irradiate.

The primary reflective region of the reflector sheet 33 onto which the light sources 311 irradiate specifically refers to a region with light reflection where a luminous surface of the light sources 311 irradiates onto the reflector sheet 33 for the first time. The light sources 311 usually have a spherical or an ellipsoid luminous surface, so the primary reflective region of the reflector sheet 33 onto which the light sources 311 irradiate is usually a circular or elliptic region.

The backlight module provided by the embodiments of the present invention includes a light bar, a light guide plate and a reflector sheet, the light guide plate and the reflector sheet are adhered to each other, and the light bar is located on one side of the light guide plate and includes a plurality of light sources arranged at intervals. Further, an anti-reflection structure used for reducing light reflected by the reflector sheet which is emitted from the light sources is disposed on at least one side of the light guide plate or the reflector sheet. Thus, light from the front sides of the light sources is prevented from being reflected by the reflector sheet, and there is no obvious difference between light outgoing from front side areas of the light sources, light between two light sources and light from the edge area of the backlight module, so that the occurrence of a hotspot phenomenon or edge light reflection is avoided effectively, the luminescence uniformity of the backlight module is improved, and the display effect of a liquid crystal display device is improved significantly.

It is to be noted that, in the embodiments of the present invention, LED may be used as the light sources of the backlight module to improve the luminescence quality of the backlight module because the LED have the advantages of high brightness, low power consumption and so on.

Further, the first anti-reflection structure 341 may specifically include a plurality of first hollow regions 331 located on one side of the reflector sheet 33 close to the light bar 31, and the first hollow regions 331 are in one-to-one correspondence with the positions of the light sources 311.

The first hollow regions 331 may be circular, elliptic or rectangular in shape.

Figure 5:
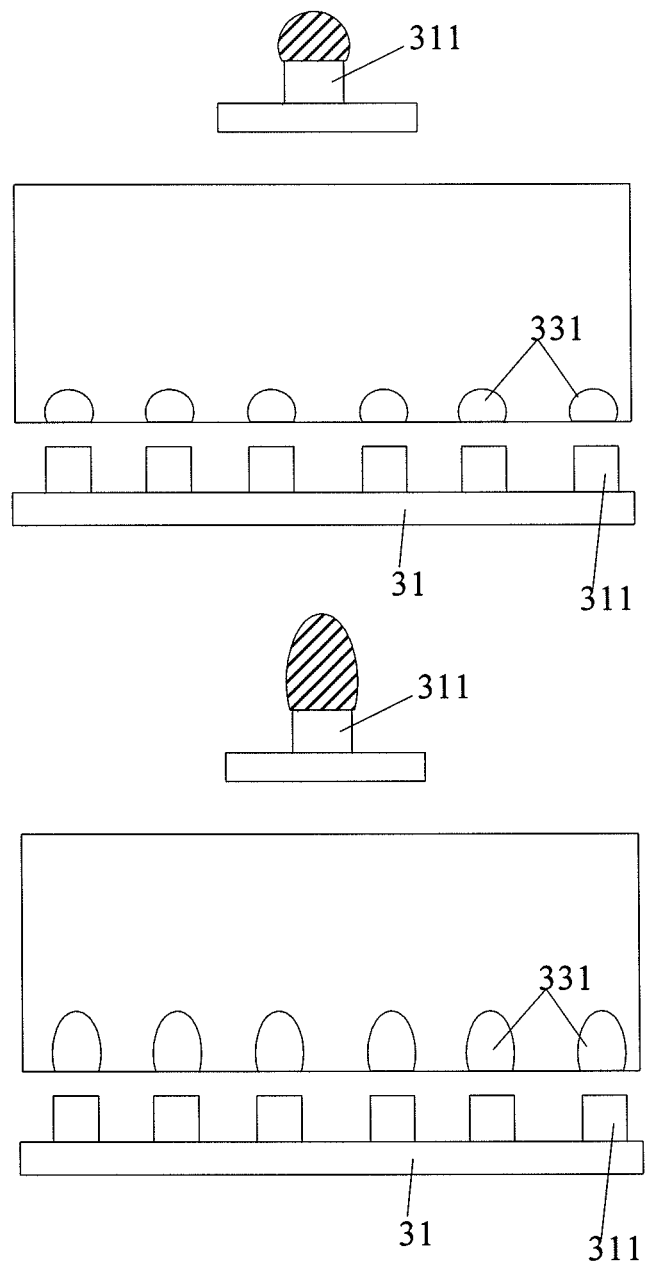
FIG. 5 is a schematic view illustrating the correspondence in terms of shape of the region of an anti-reflection structure to the luminous surface of light sources in the backlight module.

Specifically, when different illuminating are used as the light sources of the backlight module, the luminous surfaces of the light sources have great differences due to different standards of the light sources, so that the shapes and areas of the primary reflective region of the reflector sheet on which light emitted from the light sources irradiates through the light guide plate are different from each other. Therefore, the region of the first anti-reflection structure 341 should be corresponding in terms of shape to the primary reflective region in order to avoid unnecessary light reflection. For example, in the backlight module as shown in FIG. 5, when the primary reflective region is circular in shape (the slash region in FIG. 5), the first anti-reflection structure 341 is a circular region correspondingly; and, when the primary reflective region is elliptic in shape, the first anti-reflection structure 341 is an elliptic region correspondingly, so as to ensure that the reflector sheet 33 reflects less light or totally does not reflect light emitted from the light sources 311. Certainly, the above description is just for illustration, and the luminous surface of the light sources and the region of the anti-reflection structure 34 are not limited in shape in the embodiments of the present invention.

The area of the primary reflective region of the reflector sheet 33 onto which the light sources 311 irradiate is less than or equal to the area of the first hollow regions 331.

With the anti-reflection structure of such a structure, by hollowing the reflector sheet 33 of the primary reflective region on the front side of light sources 311 at a light incident side, light from the front side of the light sources 311 cannot be output from the front side of the backlight module through the reflection of the reflector sheet 33, so that the brightness of the front luminous surface of the light sources 311 is reduced, the brightness of the region of the front luminous surface of the light sources 311 and the region between two light sources 311 is balanced, and the obvious bright/dark phenomenon will not be generated. Further, there is a certain angle of light outgoing from the light sources, so the size of the first hollow regions 331 is in direct proportion to the spacing between the light sources 311 to the light guide plate 32.

Figure 6A:
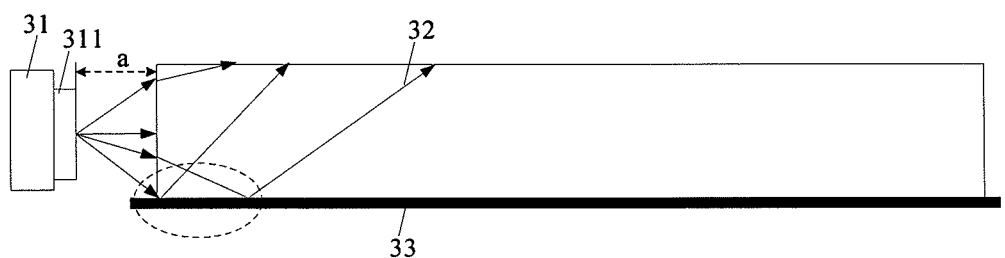
FIG. 6a is a schematic view of a structure of a backlight module according to another embodiment of the present invention.
Figure 6B:
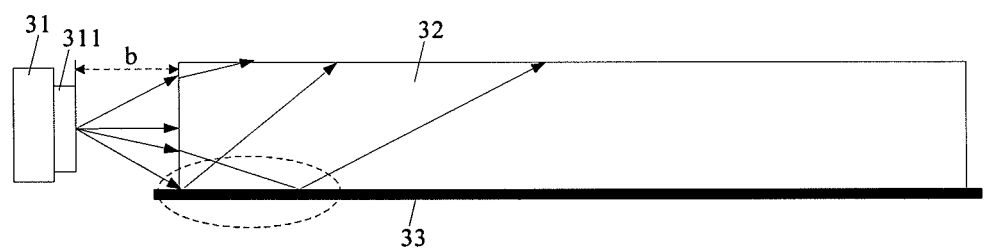
FIG. 6b is a schematic view of a structure of a backlight module according to another embodiment of the present invention.

Specifically, as shown in FIGS. 6a and 6b, in FIG. 6a, the spacing between the light sources 311 and the light guide plate 32 is a. In FIG. 6b, the spacing between the light sources 311 and the light guide plate 32 is b, and a is less than b. It can be seen that, with the increase of the spacing between the light sources 311 and the light guide plate 32, the range of the primary reflective region (shown by the range of a dashed box in FIGS. 6a and 6b) of the reflector sheet 33 onto which the light sources 311 irradiate also increases correspondingly. Therefore, when the spacing between the light sources 311 and the light guide plate 32 increases, it is required to correspondingly increase the size of the first hollow regions 331 to ensure that light from the front side of the light sources 311 cannot be output from the front side of the backlight module through the reflection of the reflector sheet 33.

Figure 7:
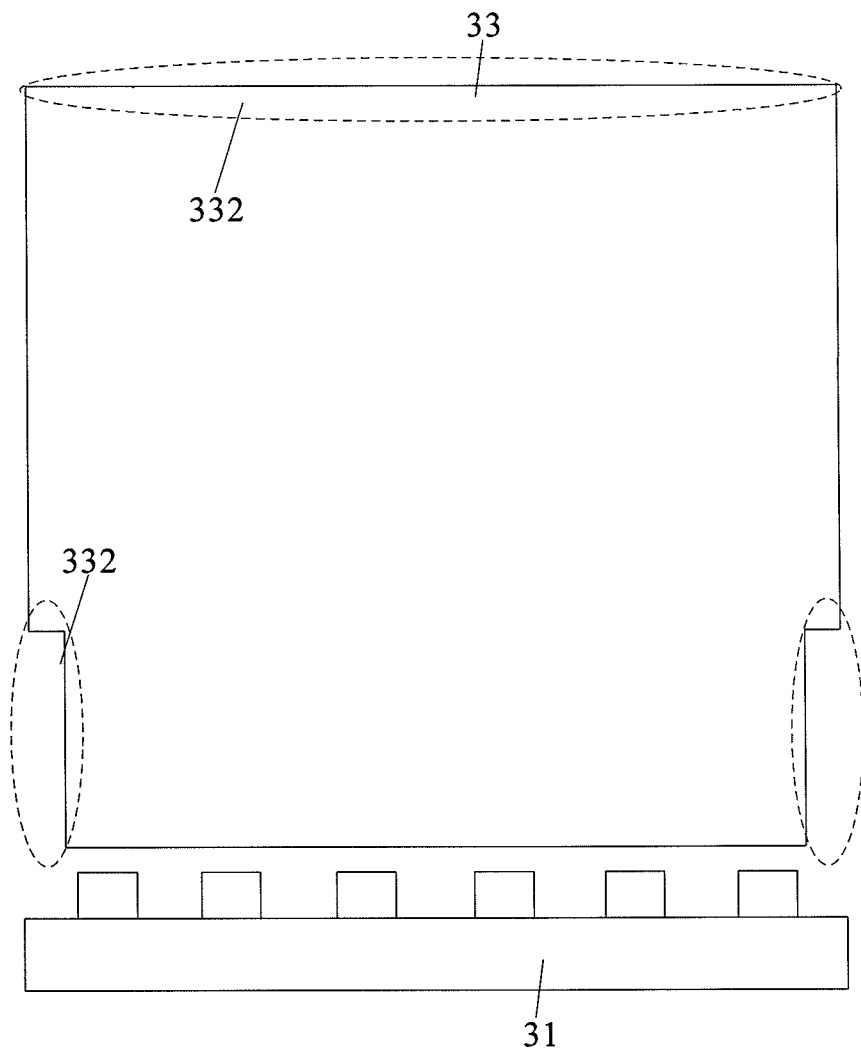
FIG. 7 is a schematic view of a structure of a backlight module according to still another embodiment of the present invention.

Further, as shown in FIG. 7, the second anti-reflection structure 342 may include second hollow regions 332 located on edges of the reflector sheet 33 corresponding to two sides of the light bar 31 and/or located on an edge of one side of the reflector sheet 33 away from the light bar 31.

Specifically, the second hollow regions 332 may be arranged selectively according to the actual reflection condition of the reflector sheet 33. If there is light reflection on both sides of the reflector sheet 33 at the light incident side, part of both left and right sides of the reflector sheet 33 are cut off to form the second hollow regions 332. If there is light reflection of the reflector sheet 33 at a side opposite to the light incident side, part of the upper side of the reflector sheet 33 may be cut off to form the second hollow regions 332, so that the occurrence of light reflection is avoided. In the backlight module as shown in FIG. 7, the description is illustrated by taking the upper, left and right sides of the reflector sheet 33 all being provided with the second hollow regions 332 as example.

In addition, the second hollow regions 332 and the first hollow regions 331 may be simultaneously arranged according to practical situations, as shown in FIG. 4. Certainly, they may also be arranged independently, which is not limited in the present invention.

The anti-reflection structure applied to the reflector sheet 33 may be similarly applied to the light guide plate 32. That is, the portion of the primary reflective region corresponding to the front side of the light sources 311 at the light incident side may be removed from the light guide plate 32, and the first hollow regions are provided on the light guide plate 32, so that the brightness of the front luminous surface of the light sources 311 is reduced correspondingly, and the problem of bright and dark intervals is weakened. Or, the light reflection on the front side of the light sources 311 may also be restrained by changing a dot-pattern layer on one side of the light guide plate. Specifically, in an existing backlight module, the light guide plate 32 usually further includes a dot-pattern layer 321 disposed close to a surface on one side of the reflector sheet 33. The function of the dot-pattern layer 321 lies in that incoming light of the light sources 311 to the light guide plate 32 may be further emerged to the reflector sheet 33 under the light guide plate 32 by the dot-pattern layer 321 on the bottom side of the light guide plate 32. By changing the density of dot-patterns in the dot-pattern layer 321, the quantity of emergent light to the reflector sheet 33 may be controlled effectively.

Figure 8:
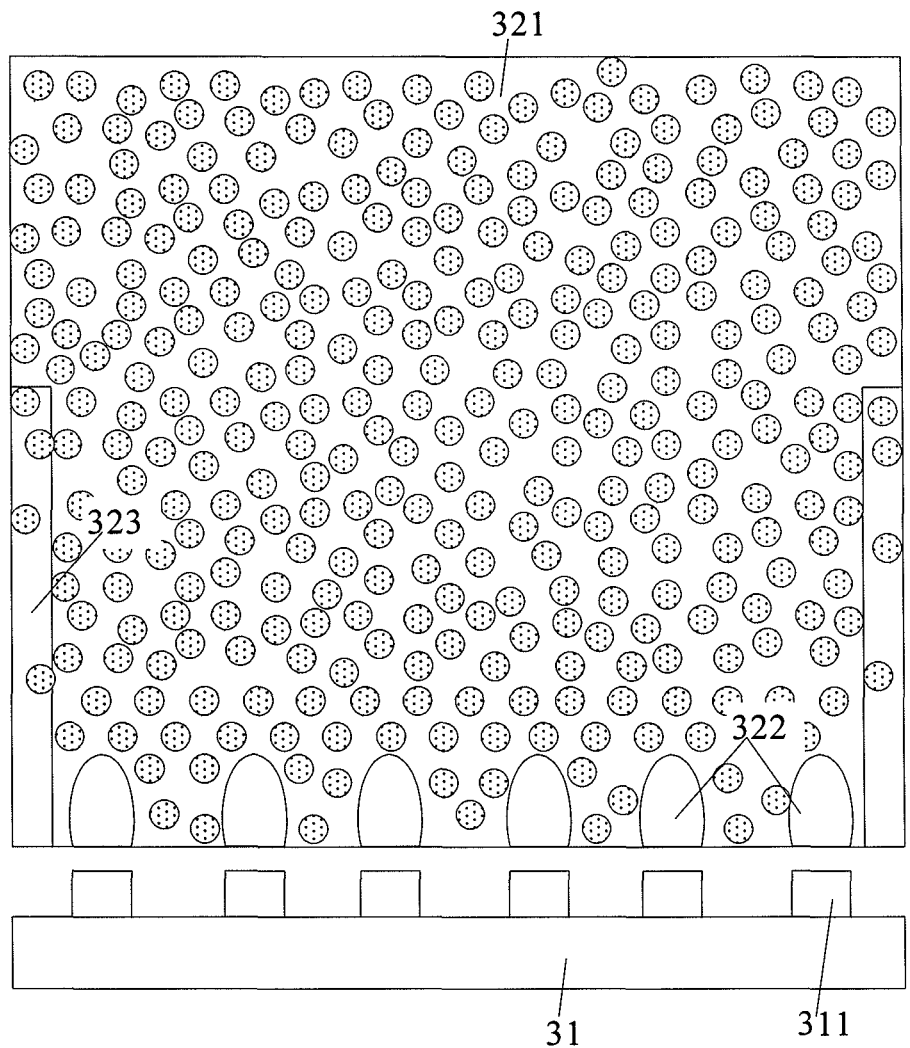
FIG. 8 is a schematic view of a structure of a dot-pattern layer according to an embodiment of the present invention.

Specifically, as shown in FIG. 8, the dot-pattern layer 321 may include a plurality of first transmission-prevention regions 322 provided on one side of the dot-pattern layer 321 close to the light bar 31, and the first transmission-prevention regions 322 are in one-to-one correspondence with the positions of the light sources 311.

In the dot-pattern layer 321, the dot-pattern density of the first transmission-prevention regions 322 is less than that of the dot-pattern layer 321 other than the transmission-prevention regions. Specifically, the dot-pattern density of the first transmission-prevention regions 322 may be 0. In the backlight module as shown in FIG. 8, the description is illustrated by taking no dot-pattern provided in the transmission-prevention region 322 of the dot-pattern layer 321 as example.

Similar to the above embodiment, the first transmission-prevention regions 322 may be circular, elliptic or rectangular or in other shapes.

Further, the size of the first transmission-prevention regions 322 may also be in direct proportion to the spacing between the light sources 311 and the light guide plate 32. The principle may refer to the above embodiment and will not be repeated here.

In another aspect, as shown in FIG. 8, the dot-pattern layer 321 may include second transmission-prevention regions 323 provided on edges of the dot-pattern layer 321 corresponding to two sides of the light bar 31 and/or located on an edge of one side of the dot-pattern layer 321 away from the light bar 31.

In the dot-pattern layer 321, the dot-pattern density of the second transmission-prevention regions 323 is less than that of the dot-pattern layer 321 other than the transmission-prevention regions.

In this case, as a strong reflection phenomenon usually occurs on one side close to the light incident side, in the second transmission-prevention regions 323, the dot-pattern density of one side close to the light bar 31 may be less than that of one side away from the light bar 31, to further reduce the reflection on one side close to the light incident side.

With the anti-reflection structure of such a structure, by reducing the dot-pattern density of the dot-pattern layer 321 of the primary reflective region on the front side of the light sources 311 at the light incident side and the dot-pattern density of the dot-pattern layer 321 corresponding to two edges of the light bar 31, less or no light of the primary reflective region on the front side of the light sources 311 and/or the edge of the light guide plate can be emerged to the reflector sheet 33 through the dot-pattern layer 321 and then output from the front side of the backlight module through the reflection of the reflector sheet 33, so that the reflective brightness of the luminous surface on the front side of the light sources 311 and on the edge of the light guide plate is reduced, the brightness of the primary reflective region on the front side of the light sources 311, the luminous region at the edge of the light guide plate and the region between two light sources 311 is balanced. Thus, no obvious bright/dark or edge light reflection phenomenon will be generated, and the luminescence uniformity of the backlight module is improved.

The embodiments of the present invention further provide a liquid crystal display device. The liquid crystal display device includes the backlight module described above.

In the embodiments of the present invention, the liquid crystal display device may specifically include a liquid crystal display, a liquid crystal TV, a digital photo frame, a mobile phone, a tablet computer or any other product or component having a display function.

The detailed structure of the backlight module has been described in details in the foregoing embodiment, and will not be repeated here.

The liquid crystal display device provided by the embodiments of the present invention includes a backlight module, the backlight module includes a light bar, a light guide plate and a reflector sheet, the light guide plate and the reflector sheet are adhered to each other, and the light bar is located on one side of the light guide plate and includes a plurality of light sources arranged at intervals. Further, an anti-reflection structure used for reducing light reflected by the reflector sheet which is emitted from the light sources is disposed on at least one side of the light guide plate or the reflector sheet. Thus, light outgoing from the front sides of the light sources is prevented from being reflected by the reflector sheet, and there is not an obvious brightness difference between light from areas on the front side of the light sources, light between two light sources and light from the edge area of the backlight module, so that the occurrence of a hotspot phenomenon or edge light reflection is avoided effectively, the luminescence uniformity of the backlight module is improved, and the display effect of a liquid crystal display device is improved significantly.

The foregoing descriptions merely show specific embodiments of the present invention, but the protection scope of the present invention is not limited thereto. Any change or substitution easily conceived by a person skilled in the art within the technical scope of the present invention shall fall into the protection scope of the present invention. Therefore, the protection scope of the present invention shall be defined by the claims.

The invention claimed is:

1. A backlight module, comprising a light bar, a light guide plate and a reflector sheet, the light guide plate and the reflector sheet being adhered to each other, the light bar being located on one side of the light guide plate and comprising a plurality of light sources arranged at intervals, wherein, an anti-reflection structure is provided on at least one side of the light guide plate and/or the reflector sheet and used for reducing light reflected by the reflector sheet which is emitted from the light sources;

the anti-reflection structure comprises a first anti-reflection structure and/or a second anti-reflection structure, the first anti-reflection structure being located on a first side of the light guide plate and/or the reflector sheet close to the light bar, while the second anti-reflection structure being located on at least one side other than the first side of the light guide plate and/or the reflector sheet, wherein the first anti-reflection structure corresponds in shape to the primary reflective region of the reflector sheet onto which the light sources irradiate.

2. The backlight module according to claim 1, wherein, the first anti-reflection structure comprises a plurality of first hollow regions located on one side of the reflector sheet close to the light bar, and the first hollow regions are in one-to-one correspondence with the positions of the light sources.

3. The backlight module according to claim 2, wherein the first hollow regions are circular, elliptic or rectangular in shape; and the area of the primary reflective region of the reflector sheet onto which the light sources irradiate is less than or equal to the area of the first hollow region.

4. The backlight module according to claim 1, wherein, the second anti-reflection structure comprises second hollow regions located on edges of the reflector sheet corresponding to two sides of the light bar and/or located on an edge on one side of the reflector sheet away from the light bar.

5. The backlight module according to claim 1, wherein the light guide plate further comprises a dot-pattern layer disposed close to a surface on one side of the reflector sheet; and a plurality of transmission-prevention regions are provided on the dot-pattern layer.

6. The backlight module according to claim 5, wherein, a plurality of first transmission-prevention regions are provided on one side of the dot-pattern layer close to the light bar, and the first transmission-prevention regions are in one-to-one correspondence with the positions of the light sources; and in the dot-pattern layer, the dot-pattern density of the first transmission-prevention regions is less than that of the dot-pattern layer other than the transmission-prevention regions.

7. The backlight module according to claim 5, wherein, a plurality of second transmission-prevention regions are provided on edges of the dot-pattern layer corresponding to two sides of the light bar and/or an edge on one side of the dot-pattern layer away from the light bar; and in the dot-pattern layer, the dot-pattern density of the second transmission-prevention regions is less than that of the dot-pattern layer other than the transmission-prevention regions.

8. The backlight module according to claim 7, wherein, in the second transmission-prevention regions, the dot-pattern density on one side close to the light bar is less than that on the side away from the light bar.

9. The backlight module according to claim 1, wherein the light sources include LED.

10. A liquid crystal display device, comprising the backlight module according to claim 1.

* * * * *